United States Patent [19]

Chapman

[11] 4,017,674
[45] Apr. 12, 1977

[54] METHOD FOR STARTING OPERATION OF A RESISTANCE MELTER

[75] Inventor: Christopher Charles Chapman, Richland, Wash.

[73] Assignee: The United States of America as represented by the United States Energy Research and Development Administration, Washington, D.C.

[22] Filed: Jan. 16, 1976

[21] Appl. No.: 649,770

[52] U.S. Cl. .......................................... 13/23; 13/6
[51] Int. Cl.² .................... C03B 5/02; F27D 11/04; H05B 3/60
[58] Field of Search ...................... 13/6, 23; 314/34

[56] References Cited
UNITED STATES PATENTS 2,711,435  6/1955  Humphrey ............................ 13/23

Primary Examiner—R. N. Envall, Jr.
Attorney, Agent, or Firm—Dean E. Carlson; James W. Weinberger; Arthur A. Churm

[57] ABSTRACT

A method for starting the operation of a resistance furnace, where heating occurs by passing a current through the charge between two furnace electrodes and the charge is a material which is essentially electrically nonconductive when in a solid physical state but which becomes more electrically conductive when in a molten physical state, by connecting electrical resistance heating wire between the furnace electrodes, placing the wire in contact with the charge material between the electrodes and passing a current through the wire to heat the wire to a temperature sufficient to melt the material between the furnace electrodes so that as the material melts, current begins to pass between the electrodes through the melted material, further heating and melting more material until all current between the electrodes passes through the charge material without the aid or presence of the resistance element.

6 Claims, 1 Drawing Figure

U.S. Patent            April 12, 1977            4,017,674
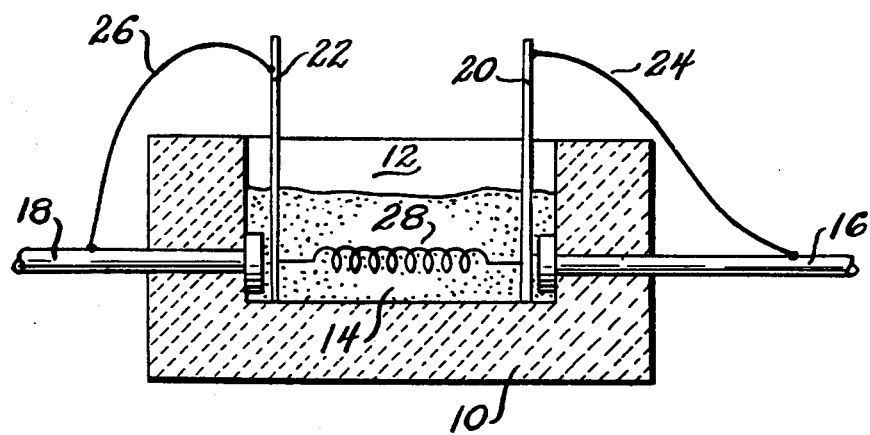

METHOD FOR STARTING OPERATION OF A RESISTANCE MELTER

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a method for starting the operation of a resistance furnace or melter. More specifically, this invention relates to a method for starting the operation of a resistance furnace for melting wherein the heating occurs by the resistance of the material to be melted to the passage of current therethrough, and the material is essentially electrically nonconductive when in a solid state.

The production of material such as glass which has a high melting temperature, requires large quantities of fossil fuels, such as natural gas, oil or producer gas made by treating coal. Due to increased costs and potential shortages of these fuels, attention is being given to alternative heating methods. Ceramic lined all electric glass melters are gaining broader use in the glass industry because of high capacity, long life, low volatilization and superior glass quality in addition to saving of fossil fuels and lessened environmental pollution.

In this type of melter the electrical current is passed between immersed electrodes through the molten glass, where the electrical energy is converted to heat by an amount equal to the current squared times the resistance of the molten glass ($I^2R$), called the Joule effect. Dissipation of energy directly into the glass allows the melter to thoroughly melt even the most difficult glasses and insures high glass quality. Glasses with high iron or chrome content are sometimes difficult to melt by external heating means because infrared absorption by the iron and chrome reduces the effective thermal conductivity of the glass at high temperature. By using a resistance melter, glasses with a high iron content can be melted without difficulty.

One obstacle with the use of a furnace or melter of this type is the difficulty in establishing operation of the melter when used with materials such as glass which are essentially electrically nonconductive when in a solid state, but which become more electrically conductive when in a molten state. Since most glasses do not become adequately conductive until heated to a temperature in excess of 700° C. a good deal of heating is necessary before the melter itself becomes operational.

At present, such material is generally melted by heating with fossil fuels and using the hot gases to melt the material. This requires that a refractory cover or crown be installed over the melting cavity, even though it is used only during start-up. A gas or oil start-up also requires an off-gas treatment system during start-up to meet governmental air quality standards. Another start-up method might be to use radiant heating above the melting cavity, however, some glass compositions contain large amounts of iron oxide which insulates the material under the surface from heat. This is a particular problem when attempting to start a melter containing glass which has frozen in place and in which the electrodes are submerged far below the surface of the glass.

SUMMARY OF THE INVENTION

I have developed a method for starting the operation of a resistance furnace which eliminates most of the abovedescribed problems and which is simple and relatively inexpensive to use. My invention is a method for starting the operation of a resistance furnace for melting a charge, where the furnace contains two opposed primary electrodes and heat is produced by the resistance of the charge to current flowing through the charge between the electrodes, and the charge is material which is essentially electrically nonconductive when in a solid physical state, but which becomes more electrically conductive in a molten physical state, by:

a. connecting electrical resistance heating wire electrically between the primary electrodes so that the heating wire is in contact with the material of the charge along a path between the electrodes;

b. passing a current between the electrodes through the heating wire said current being sufficient to heat the wire to a temperature high enough to melt the charge in contact with the wire to form a path of molten charge material between the primary electrodes, so that the current can pass directly between the electrodes through the molten charge material, whereby operation of the resistance furnace is started.

While the method of the invention was developed particularly for use with resistance furnaces that are used to produce or melt glass, it may be equally applicable to other furnaces or melters where thermal energy is developed within the process fluid itself, such as for example, molten salt melters.

It is therefore one object of the invention to provide a method of starting the operation of a resistance furnace.

It is another object of the invention to provide a method of starting the operation of a resistance furnace, wherein the heat in the furnace is produced by the resistance of the charge material to the passage of current therethrough.

Finally, it is the object of the invention to provide a method of starting operation of a resistance furnace wherein the heat is produced by passage of current through the material to be heated and the material is essentially electrically nonconductive when in a solid state.

BRIEF DESCRIPTION OF THE DRAWING

The DRAWING is a cross-section of a resistance furnace showing the start-up electrodes and resistance heating wire in place.

DESCRIPTION OF THE PREFERRED EMBODIMENT

These and other objects of the method of the invention may be best understood by referring to the drawing, where furnace 10, constructed of appropriate refractory material forms a melting cavity 12 for containing the charge or material to be melted 14, which may be for example, glass batch, cullet or salt. Opposed first 16 and 18 primary melting electrodes are connected to a source of electrical power (not shown) and penetrate opposite walls of furnace 10 extending into cavity 12 for passing a current between the electrodes through the material to be melted. Extending vertically downward into the charge, in close physical proximity to the primary electrodes are first and second secondary or start-up electrodes 20 and 22 respectively which are connected electrically to the primary electrodes 16 and 18 by jumper cables 24 and 26 respectively. Resistance heater wire 28 which may consist of one or more parallel wires extending between start-up electrodes 20 and 22 and connected electrically thereto are in close physical contact with the charge 14. Alternatively, resistance heating wire 28 may be connected directly between electrodes 16 and 18.

In operation, a current applied between primary electrodes 16 and 18, passes through jumper cables 24 and 26 to start-up electrodes 20 and 22 which may be a rod or any convenient shape. The current between start-up electrodes passes through resistance heater wire 28 because the charge material is in an essentially electrically nonconductive solid form. As current flows through the resistance wire 28, it begins to heat up to a temperature sufficient to melt the charge material with which it is in contact, forming a tunnel of molten material through the charge. As the material becomes molten, it becomes electrically more conductive and eventually begins to carry some of the current between the start-up electrodes. Further power dissipation into the material enlarges the molten zone and eventually continuity between the main electrodes is achieved, the start-up electrodes can be electrically disconnected from the primary electrodes and start-up of the furnace has been achieved, and it is now ready for production melting.

The resistance wire heater and start-up electrodes may be removed from the molten charge once start-up has been accomplished, or the electrode removed and the wire left in place to oxidize and melt in the charge if the presence of the wire material is not undesirable.

The method of this invention is particularly useful for the start-up of operation of a resistance furnace or melter when the previous operation of the melter has been interrupted and the molten charge material such as glass has solidified into a single monolithic mass. To restart the melter, under these conditions, the resistance heater wire, attached to the start-up electrodes is placed on top of the solidified charge and the start-up electrodes are placed vertically above the solid charge in close proximity to the primary electrodes buried below the top of the charge. After connecting the start-up electrodes in electrical parallel to the primary electrodes, current flow through the resistance wire begins to heat the surrounding solid charge. Further power dissipation within the wire causes a zone of charge material around the wire to become conductive. This zone enlarges as additional power is released. Eventually continuity between the start-up electrodes through the molten charge is achieved. As the charge melts, the start-up electrodes settle toward the bottom of the melting cavity, close to the primary electrodes, ultimately continuity between the primary electrodes is achieved, and start-up of the operation of the melter has been accomplished. It is important that the start-up electrodes be positioned so that as they settle, the zone of molten material extends to the primary electrodes, so that eventually a path of molten material extends between the primary electrodes.

The resistance heating wire and electrodes may be of any material which is capable of withstanding the environment in the furnace or melter and which is compatible with the material being melted. It is advantageous if the heating wire will dissolve in and mix with the charge material once start-up of operation of the furnace or melter has been accomplished to eliminate the necessity of recovering the wire from the molten charge. For example, for the preparation of glass where impurities are not important, resistance heating elements of aluminum-chromium-cobalt-iron alloy are satisfactory as are elements of nickel-chromium alloy, silicon carbide and molybdenum disilicide. Where impurities are important, molybdenum disilicide may be preferred. The amount of resistance wire necessary for the start-up operation will depend upon the power supply, the resistance of the wire and the power requirements to melt the material. This can be readily determined by one who is skilled in the art. The use of several resistance wires between electrodes is preferred over a single wire to provide better power dissipation and to ensure continued operation should one of the wires break. The start-up electrodes may be of a nickel-chromium alloy such as Inconel or molybdenum disilicide and may be in any convenient shape such as a rod or flat plate.

The amount of current necessary to achieve operation of the melter by the method of the invention will depend upon the particular melter resistance material, charge material and other conditions prevailing at the time and will be obvious to one skilled in the art and need not be described in detail.

EXAMPLE I

To demonstrate operation of the start-up method of the invention, four resistance wires were prepared by rolling 32 mil wires of Kanthal (aluminum 5.5% — chromium 22% — cobalt 0.5% — iron) 30 feet long into 1 inch coils which were placed in parallel on the bottom of a resistance furnace having a cavity 14 inches wide, 30 inches long and 12 inches deep. The coils were connected electrically to start-up electrodes of the nickel-chromium alloy Inconel which were 12 inches × 1 inch × ¼ inch plates propped in a vertical position at either end of the cavity close to the primary electrodes to which they were electrically connected. The cavity was filled with glass particles about ¼ inch in size. Power was then slowly applied to the electrodes and melting of the glass was started. After about 5 hours the power had been increased to 25 kilowatts, and the furnace was operating on the primary electrodes only.

EXAMPLE II

To demonstrate start-up of a furnace containing a monolithic glass block, four resistance heating wires, each containing 30 feet of 32 mil Kanthal rolled into a 1 inch diameter coils were laid in parallel on top of 10 inches of solid glass in a resistance furnace having a cavity 18 inches long, 9 inches wide and 12 inches deep. The resistance wires were electrically connected at each end to a start-up electrode of Inconel 12 inches × 5 inches × ¼ inch propped in a vertical position at either end of the cavity above the primary electrodes and connected electrically to the electrodes. About 2 kilowatts of power was applied initially and increased gradually to about 15 kilowatts as melting proceeded. The glass in the furnace was completely melted and the furnace was operating on the primary electrodes after about 7 days. Although start-up times were slow to prevent cracking of the refractory materials, start-up times as short as about 4 hours have been accomplished.

It can be seen from the previous discussion and examples that the invention provides an easy, simple and effective method for the start-up of operation of resistance furnaces and melters of the type described.

The embodiments of the invention in which an exclusive property or privilege is claimed are defined as follows:

1. A method for starting the operation of a resistance furnace for melting a charge, wherein the furnace contains two opposed primary electrodes, heat is produced by the resistance of the charge to current flowing therethrough between the electrodes, and the charge is a material which is essentially electrically nonconductive when in a solid physical state, but which becomes more electrically conductive in a molten physical state comprising:
   a. placing first and second start-up electrodes in the charge adjacent the first and second primary electrodes respectively;
   b. electrically connecting the primary electrodes to the respective start-up electrode;
   c. connecting electrical resistance heating wire electrically between the start-up electrodes, said wire being in contact with the material of the charge along a path between the two electrodes; and
   d. passing a current between the primary electrodes through the start-up electrodes and the heating wire, said current being sufficient to heat the wire to a temperature high enough to melt the charge material in contact with the wire to form a path of molten charge material between the primary electrodes so that the current can pass directly between the electrodes through the melted charge material whereby operation of the resistance furnace is started.

2. The method of claim 1 wherein the heating wire is composed of material selected from the group consisting of a nickel-chromium alloy, an aluminum-chromium-cobaltiron alloy, silicon carbide and molybdenum disilicide, and the start-up electrode is constructed of material selected from the group consisting of a nickel-chromium alloy and and molybdenum disilicide.

3. The method of claim 2 wherein the heating wire is composed of an aluminum-chromium-cobalt iron alloy and the start-up electrodes are composed of a nickel-chromium alloy.

4. The method of claim 3 wherein the heating wire is electrically connected between the start-up electrodes, extends between the start-up electrodes and the charge material is placed on top of the heating wire.

5. The method of claim 3 wherein the heating wire is electrically connected between the start-up electrodes and is placed on top of the charge material between the start-up electrodes.

6. The method of claim 1 including the further step of removing the start-up electrodes from the furnace after start-up is completed.

* * * * *